(12) United States Patent
Deshpande et al.

(10) Patent No.: US 6,931,454 B2
(45) Date of Patent: Aug. 16, 2005

(54) METHOD AND APPARATUS FOR ADAPTIVE SYNCHRONIZATION OF NETWORK DEVICES

(75) Inventors: Nikhil Deshpande, Hillsboro, OR (US); Ben H. Lee, III, Corvallis, OR (US); Greg F. Eastman, Hillsboro, OR (US); Stephen H. Dohrmann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 09/752,536

(22) Filed: Dec. 29, 2000

(65) Prior Publication Data

US 2002/0099772 A1 Jul. 25, 2002

(51) Int. Cl.[7] .............................. G06F 15/16
(52) U.S. Cl. .................. 709/248; 709/201; 709/205; 709/217; 709/229; 709/246
(58) Field of Search ................... 709/201, 205, 709/217, 229, 246, 248

(56) References Cited

U.S. PATENT DOCUMENTS

| | | | | |
|---|---|---|---|---|
| 5,664,207 A | * | 9/1997 | Crumpler et al. ............ 715/505 |
| 5,818,845 A | * | 10/1998 | Moura et al. ................ 370/449 |
| 5,819,274 A | * | 10/1998 | Jackson, Jr. ................. 707/10 |
| 5,890,156 A | * | 3/1999 | Rekieta et al. ................ 707/10 |
| 5,928,329 A | * | 7/1999 | Clark et al. ................. 709/227 |
| 6,034,621 A | * | 3/2000 | Kaufman .................... 340/7.21 |
| 6,088,706 A | * | 7/2000 | Hild .......................... 707/202 |
| 6,243,705 B1 | * | 6/2001 | Kucala ........................ 707/10 |
| 6,411,989 B1 | * | 6/2002 | Anupam et al. ............ 709/204 |
| 6,430,601 B1 | * | 8/2002 | Eldridge et al. ............ 709/206 |
| 6,553,236 B1 | * | 4/2003 | Dunko et al. ............... 455/457 |
| 6,564,055 B1 | * | 5/2003 | Hronek ....................... 455/433 |
| 6,678,882 B1 | * | 1/2004 | Hurley et al. ............... 717/121 |
| 6,779,019 B1 | * | 8/2004 | Mousseau et al. .......... 709/206 |

* cited by examiner

*Primary Examiner*—Saleh Najjar
(74) *Attorney, Agent, or Firm*—Blakely, Sokoloff, Taylor and Zafman

(57) ABSTRACT

A method and apparatus for synchronizing data on a network is disclosed. In one embodiment, the invention comprises a method including establishing a wireless communications channel between a first mobile computer device belonging to a workgroup and a second device and determining if the second device belongs to the workgroup of the first device. If the second device belongs to the workgroup of the first device, then the method further includes receiving data at the first device from the second device through the wireless communications channel and resolving conflicts between the received data and data of the first device.

25 Claims, 8 Drawing Sheets

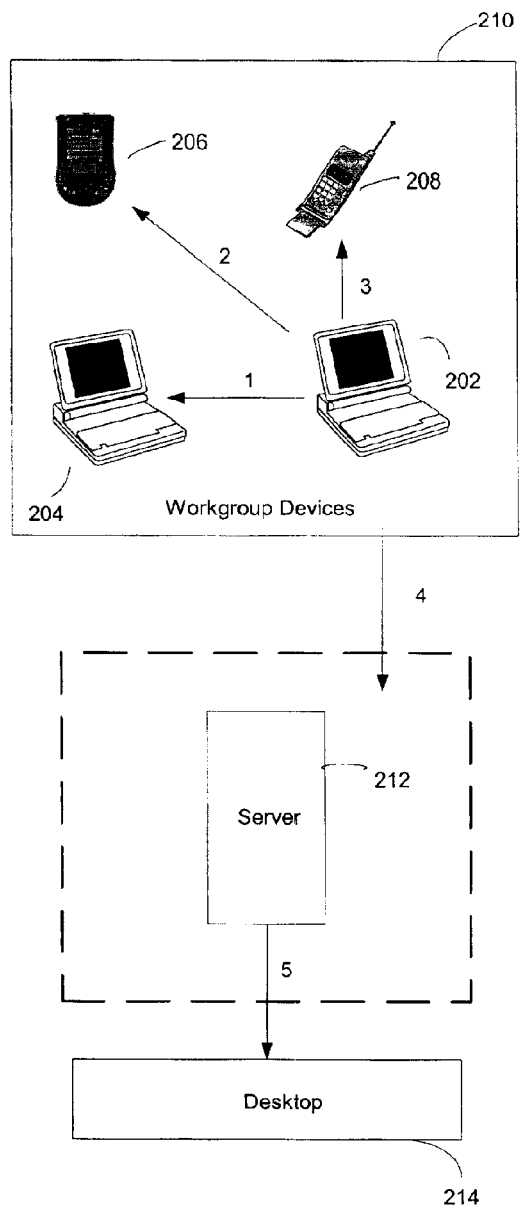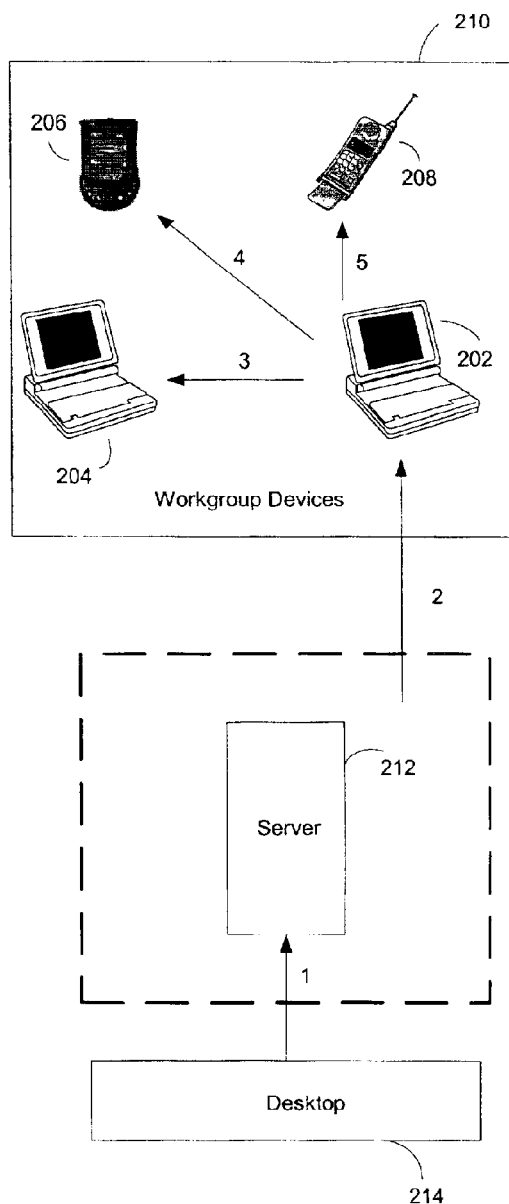
Figure 2                          Figure 3

METHOD AND APPARATUS FOR ADAPTIVE SYNCHRONIZATION OF NETWORK DEVICES

BACKGROUND OF THE INVENTION

1. Field of the Invention

The invention relates generally to the field of electronic device network synchronization. More particularly, the invention relates to a method and apparatus to synchronize mobile network devices to a central repository when connections with the central repository are not consistent and to synchronize mobile network devices to peers in their proximity.

2. Description of the Related Art

Synchronization can be viewed as a process of making two data sets equivalent. Synchronization is important with mobile computing and communications. Synchronization provides the capability to use applications and information on one mobile device, then to merge any updates with the applications and information back at the office, on the network, or on other mobile devices. Synchronizing makes the data on all the multiple devices and servers the same.

Presently, there are two primary approaches to synchronization. In server-based synchronization, the mobile device is able to sync-up only through a central server. In this case, a central server is a neutral storage location and different mobile devices connect to the server to update information and data. This approach puts several limitations on synchronization capabilities. For devices to stay synchronized, they must attach to the server independently. Devices are unable to link directly despite the fact that they may be in close proximity to one another. If the server is unreachable or unavailable, synchronization is not possible. Advantages of this approach are that there is a single reliable source of the best data. Many offices already maintain a server to perform the same function for the wired network so cost and change is minimized. This approach also gives more flexibility for the IT staff that maintains and manages the network.

In a second approach, client-based synchronization, the clients route the synchronization information through the network until the desired recipient is found. This creates a mesh of interconnected systems with no dependency on servers. This reduces the overhead associated with maintaining a server while allowing any device to still have access to data. Because each device talks directly with any other device in the system, there are many more communication channels available. This reduces the dependency on the one connection to the one server increasing the robustness of the system and increasing the opportunities to synchronize when devices are occasionally out of touch with the server but near each other. For systems that are not already server-based, eliminating the server also reduces costs. On the other hand, there is no central database of information to backup. There is very little IT control and there is no revision or copy control. For example, a file can be copied from one client to another. This can be modified and then passed on to another client, resulting in multiple versions of the same file. Similarly two files can be named the same but contain completely different information.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which:

FIG. 2 is a block diagram illustrating data flow within a workgroup in accordance with one embodiment of the present invention;

FIG. 3 is a block diagram illustrating an alternative data flow within a workgroup in accordance with another embodiment of the present invention;

DETAILED DESCRIPTION OF THE INVENTION

Figure 1:
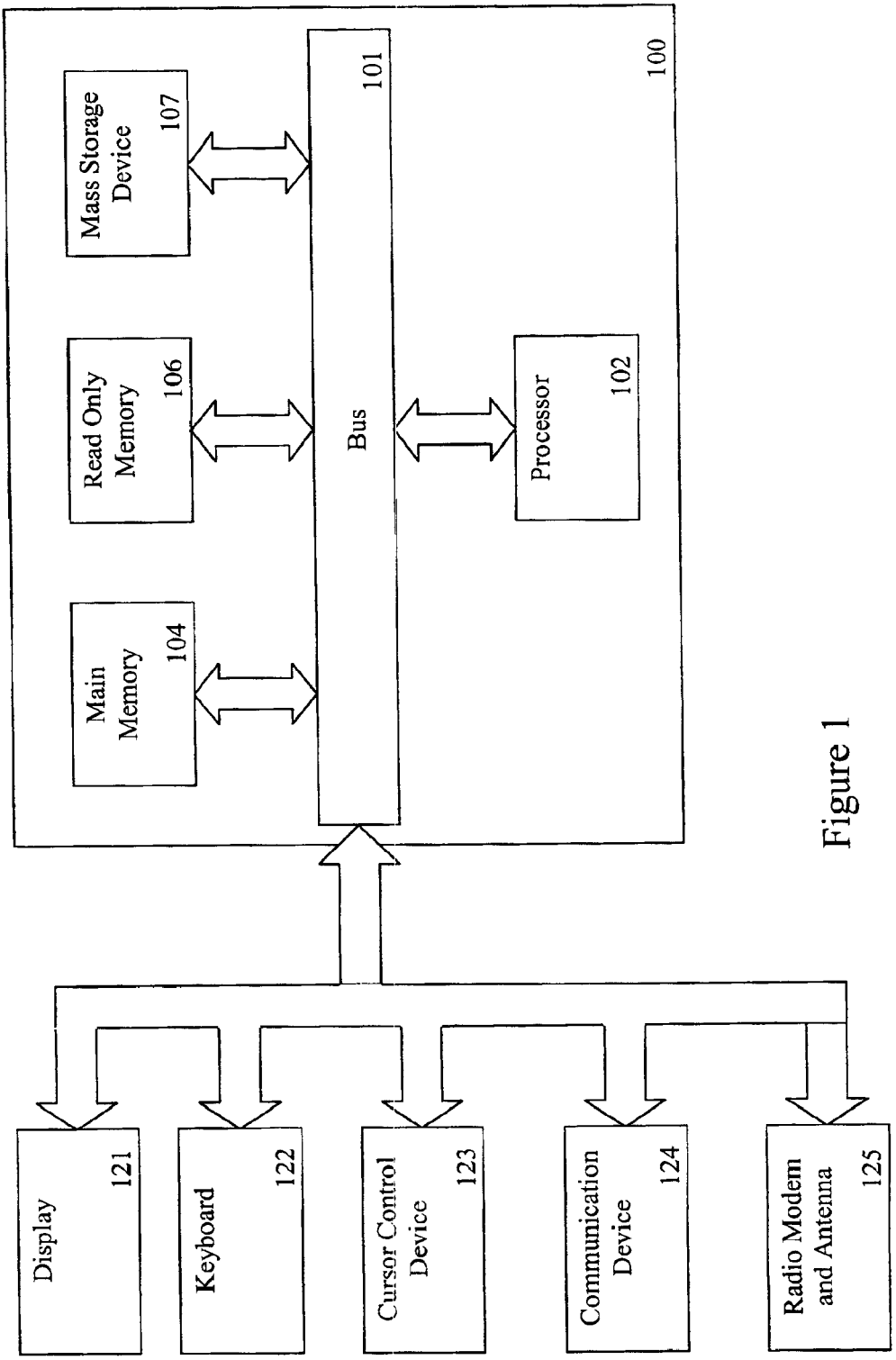
FIG. 1 is a block diagram illustrating an exemplary architecture of a wireless network device system appropriate for use with one embodiment of the present invention.

FIG. 1 is an example of a typical computer system upon which one embodiment of the present invention may be implemented. The architecture of FIG. 1 is suitable for a server as well as a client, whether desktop or mobile. The server typically has a permanent wired connection to the desktop client and the network. The mobile client can have an intermittent wired connection to the network through, for example, a synchronization port or a telephone modem or it may rely entirely on wireless communications. The server is typically a Windows, Unix or Linux-based computer system specially adapted for that application, however any minicomputer or microcomputer can also be used. The desktop is a typically a conventional office desktop microcomputer. The mobiles can be any of a variety of different portable devices, such as laptop, notebook or palmtop computers, personal data assistants, electronic calendars, or data capable portable telephones. With further semiconductor miniaturization, the variety of portable data devices will likely increase. A variety of different remotes using different communications protocols and operating systems can share the same network.

A computer system 100 representing an exemplary mobile device or server upon which features of the present invention may be implemented will now be described with reference to FIG. 1. The computer system 100 comprises a bus or other communication means 101 for communicating information, and a processor 102 coupled with the bus 101 for processing information. The computer system has a random access memory (RAM) or other dynamic storage device 104, referred to as main memory, coupled to the bus for storing information and instructions to be executed by the processor. The main memory 104 also may be used for storing temporary variables or other intermediate information during execution of instructions by the processor. The computer system also has a read only memory (ROM) or other static storage device 106 coupled to the bus for storing static information and instructions for the processor.

A data storage device 107 such as a magnetic disk or optical disc or RAM card and its corresponding drive may also be coupled to the computer system for storing information and instructions. The computer system can also be coupled via the bus to a display device 121, such as a cathode ray tube (CRT) or Liquid Crystal Display (LCD), for displaying information to an end user. For example, graphical and textual indications calendars, scheduling, spreadsheets, documents, design files, and other information may be presented on the display device. Typically, an alphanumeric input device 122, including alphanumeric and other keys, may be coupled to bus for communicating information and command selections to processor. Another type of user input device is cursor control 123, such as a mouse, a trackball, cursor direction keys or a stylus for communicating direction information and command selections to the processor and for controlling cursor movement on the display 121.

A communication device 124 is also coupled to the bus. The communication device 124 may include a modem, a network interface card, synchronization port or other well-known interface devices, such as those used for coupling to Ethernet, token ring, USB (universal serial bus) or other types of physical attachment for purposes of providing a communication link to support a local or wide area network, for example. In this manner, the computer system may be coupled to a number of clients and servers via a conventional network infrastructure, such as a company's Intranet and the Internet, for example.

A wireless communications device 125 is also coupled to the bus. The wireless communications device can be a radio or infrared device that is capable of communications in many directions simultaneously. In one embodiment, the server uses an Intel PRO/WIRELESS 2011 Access Port and the mobile devices use an Intel PRO/WIRELESS 2011 PC Card. The PRO/WIRELESS components use an unlicensed radio band to communicate data emulating a conventional wired LAN connection. Alternatively, Bluetooth™ wireless, cellular or PCS radio devices can be used by both the server and the mobiles, as well as multiple access systems, such as time division multiple access (TDMA), frequency division multiple access (FDMA) and code division multiple access (CDMA). Multiple access can be combined with frequency division duplexing (FDD) or time division duplexing (TDD). In the network, some devices may use, for example a PRO/WIRELESS PC Card to communicate while others use a Bluetooth™ radio system or both. While this may limit the ability of all network devices to communicate with all other devices, data can still be synchronized among those devices that can communicate with each other.

It is to be appreciated that a lesser or more equipped computer system than the example described above may be desirable for certain implementations. Therefore, the configuration of computer system will vary from implementation to implementation and from device to device depending upon numerous factors, such as price constraints, performance requirements, technological improvements, and other circumstances.

FIG. 2 shows an example of a network architecture suitable for use in the present invention. It is contemplated that the network may have many more clients than are shown in the drawing and that multiple servers may also be used for different functions or different interconnected networks as is well-known in the art. FIG. 2 also shows an example of a communications path suitable for illustrating one embodiment of the present invention. In FIG. 2, a set of mobile devices 202, 204, 206 and 208 are within communications reach of each other through the wireless communications device 125 of each respective device. The devices form all of a workgroup 210 or the part of a workgroup 210 for which the mobiles are all in proximity to each other. A workgroup may be a set of users in the same department, division or project area or any other set of users that belong to the same network and need to share information on the network together. The network also includes a server 212. The server may be a synchronization server only, which then maintains the central repository on another server or it may be an enterprise server for the network or any other type of server that can serve as an access port for the mobile devices. The server is optionally coupled over the network to a plurality of desktops 214. These desktops can serve as synchronization portals for the mobile devices when equipped with a wireless communications interface, as desk terminals for the members of the workgroup or as stand-alone network participants for other users.

The synchronization can be initiated by several different conditions. Examples will be presented from the perspective of one of the remote devices shown as 202 in FIG. 2. This device will be referred to as the first mobile device. Alternatively, the synchronization may begin with any others of the devices. In one embodiment, the devices are all functional peers on the network. Synchronization can begin, when the first device receives a change to a data file stored in its main memory 104 or data store 107. Such a change may be keyed in by a user, obtained from another device such as one of the peers shown in FIG. 2, obtained from the server or obtained from another device not on the network, for example from an IR link between devices running the Palm operating system. The data file change may be an added appointment, a modification to a meeting schedule or agenda or change in a drawing, spreadsheet or document. The data file change can also be a whole new schedule, agenda, drawing, spreadsheet or document or any other type of data file.

Synchronization may also begin based on a timer. In such a case, the mobile device will listen on the wireless communication channel for other devices at regular intervals. When a listening interval begins, the mobile device will listen to the channel and if any devices are detected, then it will try to synchronize with them as discussed in more detail below. Finally, synchronization may begin whenever the mobile device detects that it has entered a new environment. The environment is determined in such a case by the presence of devices with which it can synchronize. If it determines that a new device is accessible over the channel, then it will try to synchronize with it. The change in environment can be combined with the timing interval approach mentioned above, so that the device periodically looks only for new devices. Finally, synchronization can be started based on a user command. The user can be provided the capability of enabling and disabling synchronization. Upon synchronization being re-enabled, the device, In one embodiment, will immediately try to synchronize with any devices that it can access.

In order to synchronize, there are three events that can be considered. First the device finds another device with which to synchronize. Second, the device recognizes the device as one with which synchronization is permitted, for example, the device will determine if the other device is in its workgroup. Third, the device determines whether there is any data to exchange. This can be done using markers and flags in the data files and comparing the markers and flags between devices to determine if the data is different between the two devices. It can also be done by comparing the actual data, in which case, the data is first exchanged before it is determined whether an exchange is necessary or appropriate.

Figure 4:
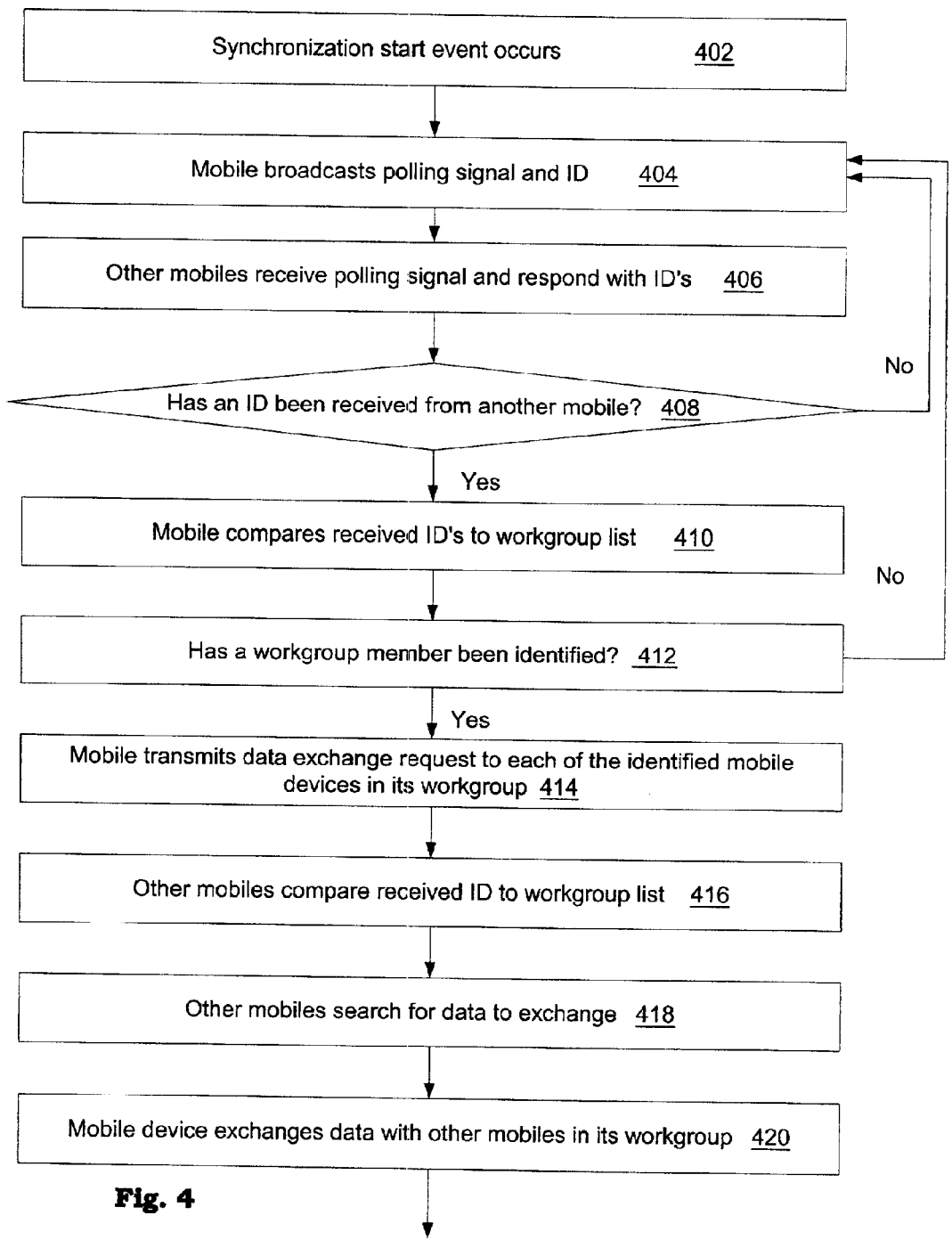
FIG. 4 is flow chart for a process of synchronizing data according to one embodiment of the present invention for a mobile-initiated transaction.
Figure 4A:
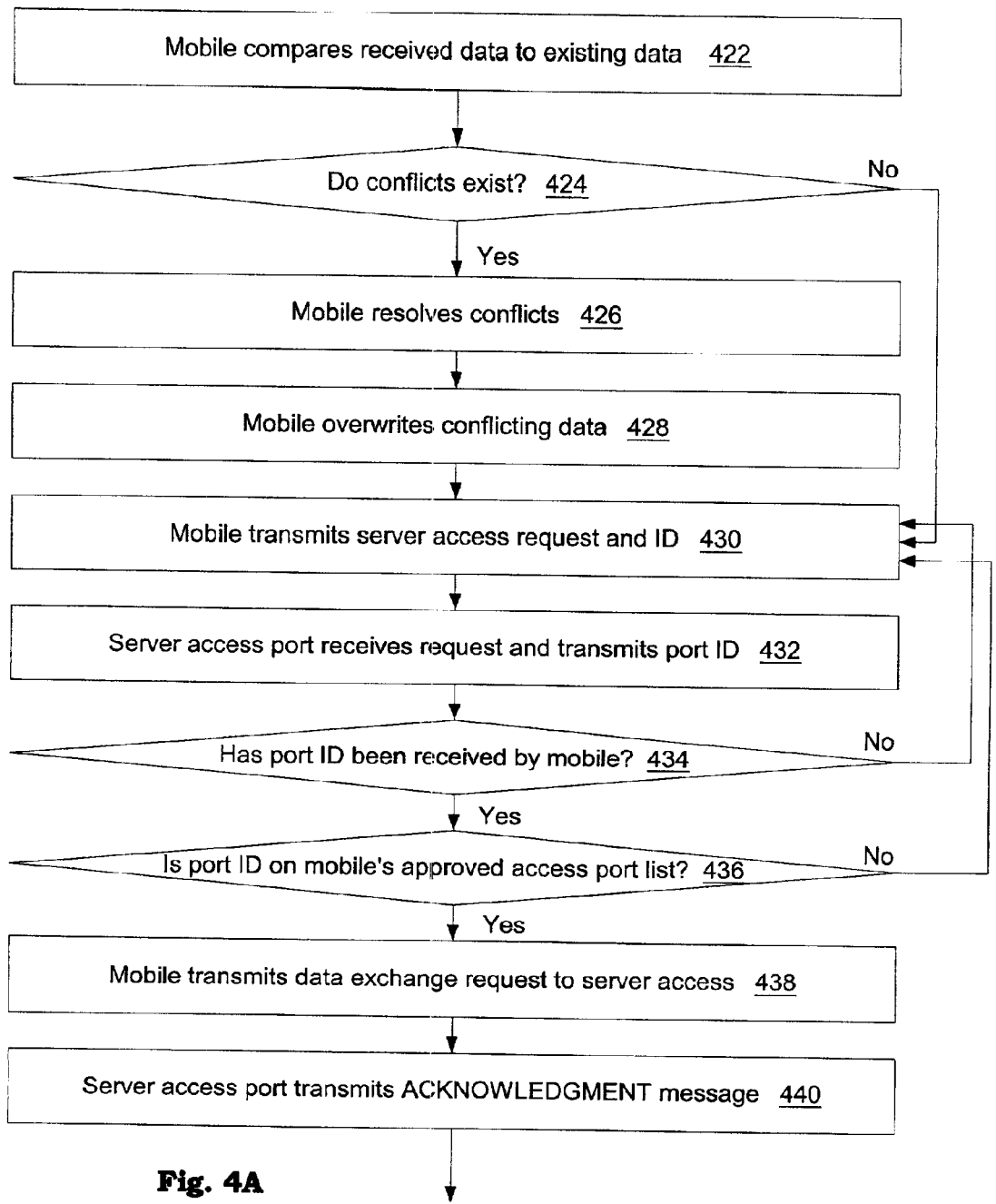
Figure 4B:
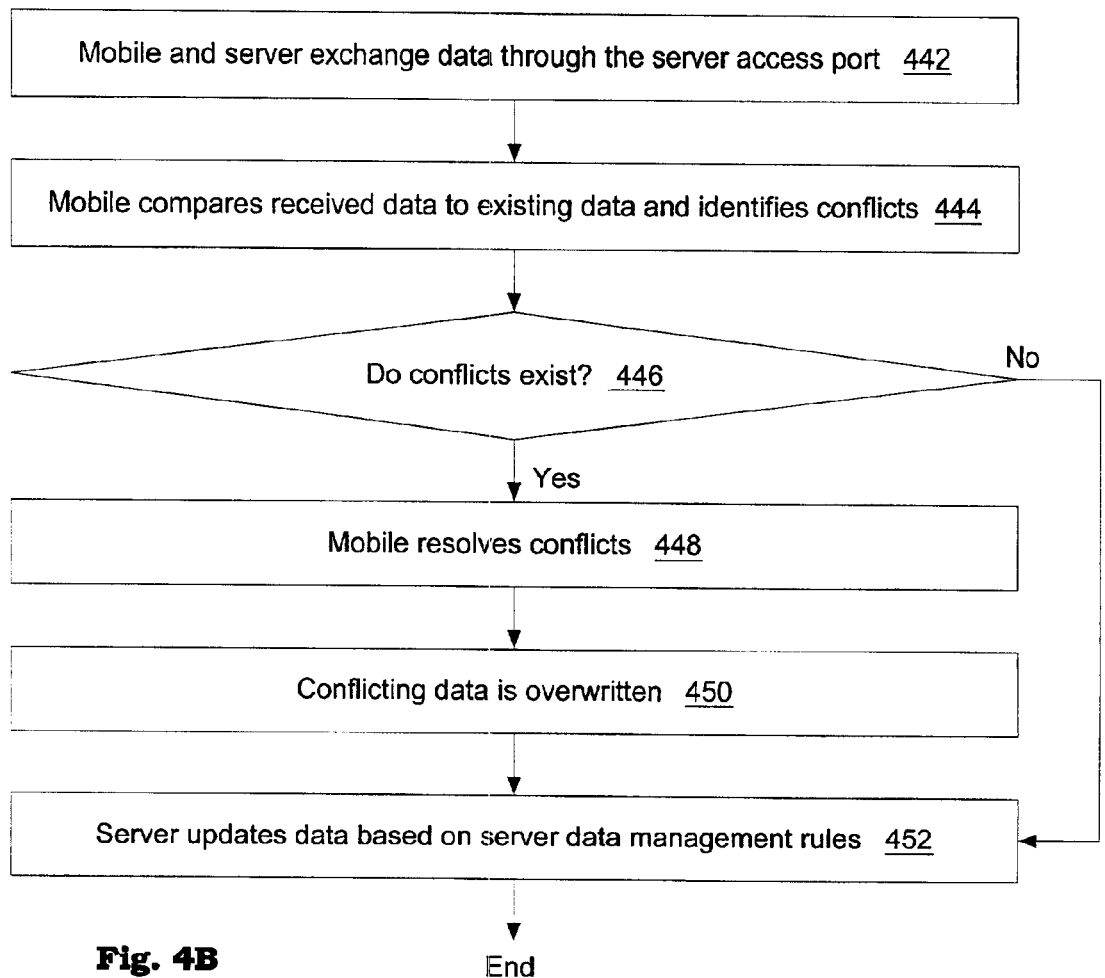

A synchronization process according to the present invention is shown in FIG. 4. The example of FIG. 4 corresponds to the numbered arrows one through 5 shown in FIG. 2. Synchronization begins 402 when an event such as one of the events discussed above occurs, receiving an update, a time-out, detecting a new user or receiving a synchronization command. In one embodiment, the mobile determines the occurrence of an event autonomously without user intervention. As a result, the user can be assured of up-to-date and synchronized data without personally having to manage or intervene in the process. To begin, the mobile device, the first device 202 in FIG. 2 broadcasts a polling signal and user or mobile id 404. Alternatively, the mobile can send its IP (internet protocol) address as an id. An e-mail address is considered a type of IP address. Instead of the polling signal, if all other devices are regularly broadcasting identification signals, the mobile can listen for the id.'s or IP addresses of others. After, the polling signal is broadcast, any other mobiles that are listening and within range of the wireless communications device receive the polling signal and respond with their own mobile or user id.'s 406. The first mobile receives these user or mobile id.'s from other mobiles within its proximity 408 and compares the received user or mobile id.'s to its own workgroup list 410.

There are many different possible protocols that can be used for the first device to find and identify other devices with which it can communicate. The polling signal described here is intended as an example only. The radio communications interfaces discussed above, such as the Intel PRO/WIRELESS 2011 and the Bluetooth™ standard have particular requirements in place for how devices identify and communicate with each other. If the mobile device's radio interface is such a device, then the process described here can be adapted to work within the appropriate standards.

Similarly, there are many different ways for the first device to determine if the other devices are in its workgroup. In one embodiment, discussed above, there is a workgroup list of mobile id.'s. This can be stored in the main 104 or mass 107 memory. The first device then exchanges data only with those devices with an id that appears on its list. Alternatively, the workgroup members may have a single shared workgroup id. The first device can then compare the received workgroup id.'s to its own workgroup id. and transmit only to those with a matching id. There are many other ways to identify devices and determine group affiliation as is well-known in the field of network management and any such approach may be adapted for use in the present invention.

If the first device is unable to identify any other workgroup members in its proximity with which it can synchronize 412, then it can wait for a preset time and re-broadcast the polling signal 404. In another network system, it can continue to listen for other mobiles until it receives a signal from one that is in its workgroup. Upon finding another workgroup member, the mobile transmits a data exchange request to each of the identified mobile devices in its workgroup 414.

The other mobiles which have been discovered by the first device receive this data exchange request and determine whether the request has been received from a device with which they are authorized to exchange information 416. In the example above, the other mobiles will compare the received user or device id to their own workgroup list. As mentioned above, there are many other possible ways to implement this identification process. Authentication and encryption protocols can also be layered onto the process in order to enhance the security of the wireless network operation.

In order to begin the synchronization, the other mobiles can search for data to exchange 418, and then the first device exchanges data with the other mobiles in its workgroup 420. The exchange can occur as a one-to-one communication or unicast in which the first device communicates to each device one device at a time or the data can be broadcast to all members of the workgroup simultaneously. As shown in FIG. 2, the first device 202, first transmits its data to another portable computer 204. Then it establishes a channel and sends the data to a personal data assistant 206 and then to a portable telephone 208. These transmissions can be done one-at-a-time using the process shown, for example, in FIG. 3 or the data can be broadcast to all three devices at once.

After the data has been exchanged then it can be compared to the existing data. The first device compares the received data to its existing data stored in its data file memory 422 and identifies conflicts 424. If conflicts are found, the mobile then resolves the conflicts 426 and overwrites any conflicting stored data with the newly received data 428. If there are no conflicts in the received data 424, then the mobile proceeds directly to access the server 430 with the data change, if there was one, that started the synchronization process 402. The conflicts can be resolved in several ways. In one embodiment, the mobile has a user preference file or a profile configured by the user or the network administrator that sets the policies for resolving conflicts. This profile can be stored in the mass memory 107 of the device. A variety of policies are possible as is well-known in the art. For example, the device can accept any data with a later version or it can accept any data with a higher priority. As a second alternative, the device can flag all the conflicts to the user and prompt the user to resolve the conflicts. If user intervention is required to resolve the conflicts, then the device will typically wait for a response from the user before overwriting the existing data. In overwriting the existing data, it is not necessary that the existing data be eliminated or that the existing data be modified. Overwriting the data saves the new data and alters the display so that the user can use and access the new data. In simple systems such as mobile PDAs, it can be desirable to replace the existing data with the new data. In systems with more memory such as servers, it may be desirable to preserve all data in historical or archival files. The network administrator or the user can control exactly how overwriting is performed in each computer system in the network.

If, after resolving conflicts 426, the data in the device has been changed 428 and a prior version of a data file has been overwritten, then the device seeks to communicate the changes with the server. To do so, the device, using the communication protocol discussed above, transmits a server access request which may contain a mobile device id. or a user id. or both 430. The server access port receives this request and transmits a port or server id. 432. This is received by the mobile device 434 which then compares the port id. to its approved access port list 436. If the mobile receives no response to its request for server access, then it can wait a preset time and attempt to access the server again 430. In another embodiment, the mobile can transmit a server id or an IP (internet protocol) address to the server to which it wishes to connect. If a server port receives the request and is able to access the requested server id. or IP address, then it can return an acknowledgment. The server id or IP address can be stored in the device by the network administrator or user. As mentioned above, there are many possible alternative ways to establish a communications channel with the mobile that can be adapted to the present invention. In addition, various types of authentication and encryption can be added to the process to enhance security.

Having established a channel with the server, the mobile transmits a data exchange request to the server access port 438. The data exchange request may instead be a request for access to a particular server or IP address. If the request is received and the server is able to service it, then the access port transmits an acknowledgment message 440. This allows the mobile and the server to exchange data through the server access port 442. The data can be exchanged like e-mails as IP addresses attached to data files or in any other way. If the mobile receives new data from the server, the mobile then compares the received data to the existing data 444 and identifies conflicts 446. After the conflicts are resolved 448, the rejected data is overwritten 450 to be replaced by any updates received from the server. The conflicts can be resolved using the various approaches discussed above or the conflicts can be resolved by the server 452 using the appropriate data management rules.

In the present example, the communication with the server was initiated by the mobile device. Accordingly, the server will likely be receiving the updated data and it will resolve any conflicts based on its own server data management rules 452. Since there may be many mobiles in the network seeking to report the same updates to the server, the server may already have received the same updates from another device and will not rewrite the updated data file. If desired, the initial exchange between the mobile and the server may include an identification of the update that the mobile desires to communicate and the server can transmit either that it will receive the update or that it has already received the update and does not wish to receive it again.

Having received an updated file, informed the mobile devices in its workgroup and informed the server, the entire network is now updated. If there are mobiles that are not within the first mobile‚s proximity, then these can be updated when they come within the range of any of the updated mobiles or the server. The update will also appear at the desktop 214 of FIG. 2 using techniques well-known in the field of wired network management. The IT staff can manage the data and backup the data without requiring access to the mobiles. The mobiles in the workgroup received the update immediately without waiting for access to the server. The first mobile, upon identifying any other mobiles that have not received the update, can send the update to them. The other updated mobiles in the workgroup can do the same. Similarly, the server in exchanges with other mobiles in the workgroup will send the update to those other mobiles.

Figure 5:
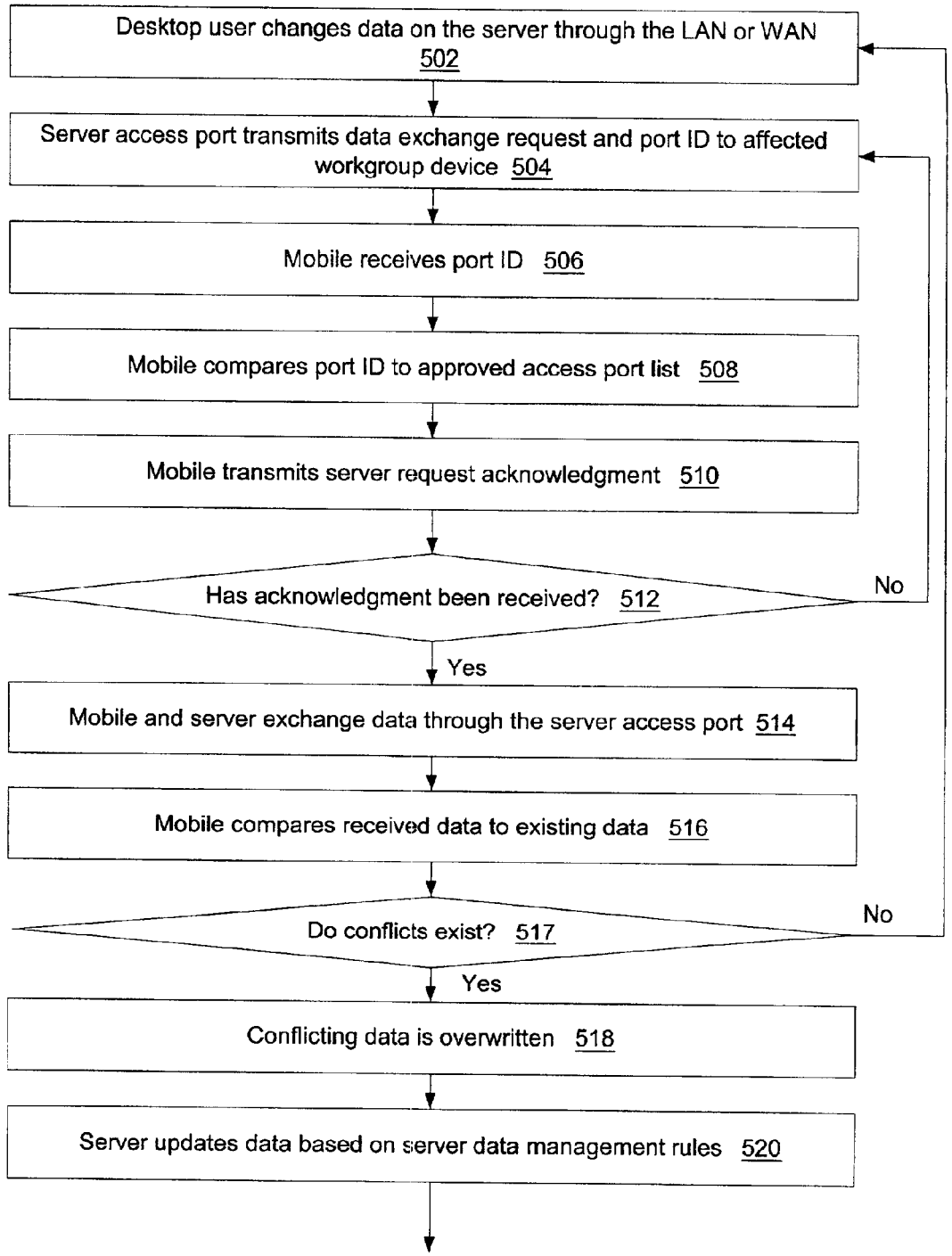
FIG. 5 is flow chart for a process of synchronizing data according to one embodiment of the present invention for a server-initiated transaction.
Figure 5A:
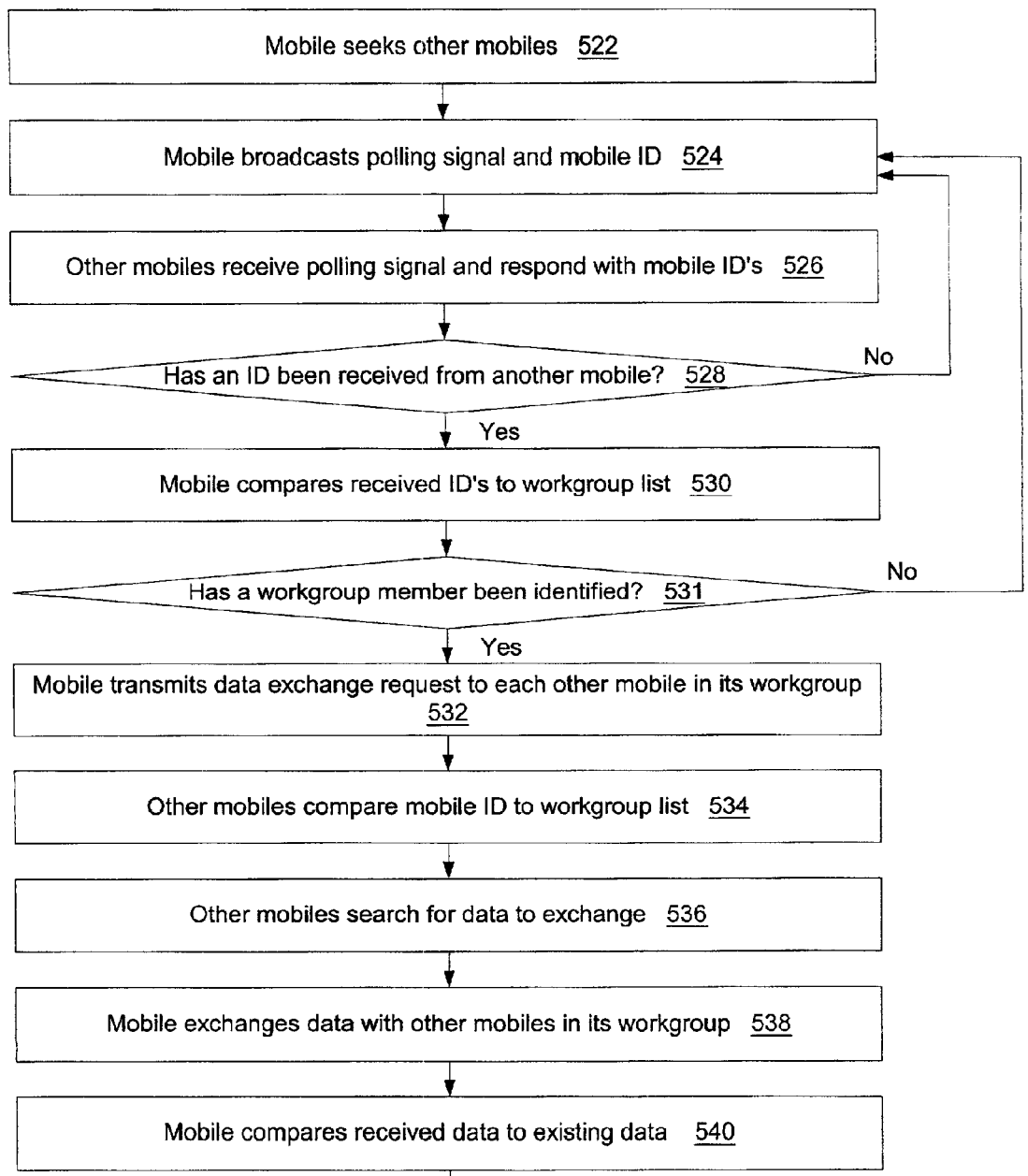
Figure 5B:
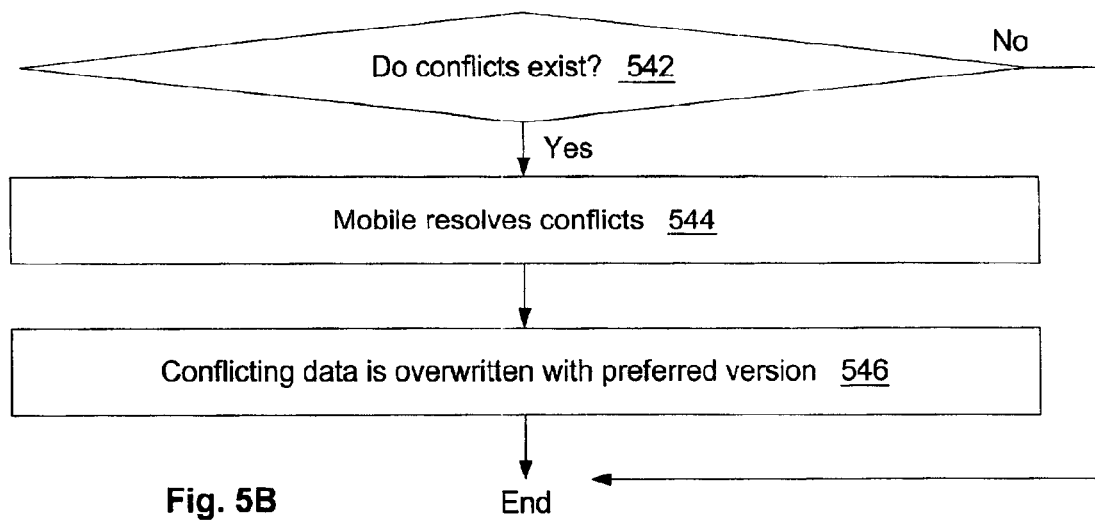

FIG. 3 shows the same workgroup 210 with mobile devices 202, 204, 206 and 208 and server 212 coupled to a desktop 214. The arrows shown in FIG. 3 relate to a synchronization shown by way of example in FIG. 5. Referring to FIG. 5, synchronization is prompted when a desktop user changes a data file on the server through a LAN or WAN 502. This desktop can be any member of the workgroup using an office desktop computer. Alternatively, the update can come from any other device on the LAN or WAN including a PDA connected to a synchronization terminal. The update can also be created by the server or the IT staff through an automated process. As shown in FIG. 3, the change from the desktop is propagated by the server 212 to one of the mobile devices 202 and from there to the other mobile devices 204, 206 and 208.

After the update is made, the server seeks out affected mobile devices that are within its proximity. In the present example, a server access port transmits a data exchange request and a port id to the affected workgroup device or devices 504. The addressed mobiles, if in range of the server access port will receive the port id 506. Then, the mobile compares the port id. to an approved access port list 508. In general, a mobile's workgroup list will always contain the server port id. This process is similar to the one described above in which the mobile seeks to establish a connection with the server. If a match is found on the stored list, then the mobile transmits a request acknowledgment to the server 510. If the server does not receive this acknowledgment because the intended mobile does not respond, then the server access port waits for a preset time and broadcasts a data exchange request again 512. The server may also seek the mobile using a different access port or through a synchronization port.

After a communication channel has been established, the mobile and server exchange data through the server access port 514 using a process similar to that described above. As with the previous example, the mobile compares data received from the server to the existing data 516 and identifies conflicts 517. The conflicting data is then overwritten 518 with the most current version and if the server receives data from the mobile, then the server updates its data based on server data management rules 520. On the other hand, if there are no conflicts 517, then the server has sent an update that the mobile has already received from another mobile or other device on the system. If so, then the server will seek out other mobiles to update and the first mobile will not be contacted until another synchronization event occurs, e.g. the data on the server is changed. As mentioned above, it may not be necessary for the server to send redundant information, a system of flags, markers or dates can allow the server and the mobile to compare versions of the data without actually transmitting the actual data files. In such a case, the comparison will occur before the data is sent.

With the update entered into the mobile device, the mobile will now seek to update any peers that it encounters which do not have access to the server and have not already received the update. This process of synchronizing is similar to the process discussed above after the mobile receives a change in a data file from the user or a peer. However, in this example, the mobile does not then seek to synchronize the update with the server because the server is the original source of the update and does not need to be synchronized.

As shown in FIG. 5, a mobile will seek out peers in its proximity 522. Peers can be discovered in any of the ways discussed above. As with the example above, the mobile broadcasts a polling signal and a mobile id 524. Other mobiles receive the polling signal and respond with their own mobile id.'s 526. If the mobile receives id.'s from the other mobiles 528, it compares the received mobile id.'s to its workgroup list 530. Otherwise, it rebroadcasts the polling signal 524 or in another embodiment, it returns to a listening mode. If workgroup members are identified 531, then the mobile transmits a data exchange request to each other mobile in its workgroup 532. Finally, the other mobiles compare the mobile's id to their workgroup lists 534.

Having established the channel, the other mobiles search for data to exchange 536. The mobile exchanges data with the other mobiles in its workgroup 538. As before, this can be done as a unicast, one mobile at-a-time or in a broadcast in which each mobile talks to all mobiles at the same time. The mobile then compares any received data to its existing data 540 and identifies conflicts 542. If there are conflicts, they are resolved 544 as discussed above and the conflicting data is overwritten with the preferred version 546. Since this communication was started by the first device after it received data from the server, there may be no new data changes to be received by the first device. However, the other mobiles will all receive the update from the server through the first device. They will then go through their own conflict resolution procedure and perform the updates. As a result, all of the mobiles will again be synchronized with the server without requiring any direct connection with the server. As will be understood by one of average skill in the art, the synchronization sequences described above do not necessarily require that the mobiles or the server be updated. Nor is it required that any one mobile update more than one other mobile in order to realize many of the advantages of the present invention.

It should be noted that, while the steps described herein may be performed under the control of a programmed processor, such as the processor 102 in FIG. 2, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment in which the recited steps are performed by a specific combination of hardware components.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable terminals, it can be applied to a wide variety of different wireless systems in which data is exchanged. Such systems include voice, video, music, broadcast and other types of data systems without external connections. The present invention can be applied to fixed remote terminals as well as to low and high mobility terminals. Many of the methods are described herein in a basic form but steps can be added to or deleted from any of the methods and information can be added or subtracted from any of the described messages without departing from the basic scope of the present invention. It will be apparent to one skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method for synchronizing data comprising:
   establishing a direct wireless communications channel between a first mobile computer device belonging to a workgroup and a second mobile computer device;
   determining if the second device belongs to the workgroup of the first device;
   if the second device belongs to the workgroup of the first device, then receiving data at the first device from the second device through the wireless communications channel; and
   resolving conflicts between the received data and data of the first device.

2. The method of claim 1, wherein establishing a channel comprises polling from the first device on a communications channel for a second device from which to obtain data.

3. The method of claim 1, wherein establishing a channel comprises scanning a radio channel for transmissions from other devices.

4. The method of claim 1, wherein establishing a channel comprises receiving identification signals at the first device sent in response to a polling message and wherein determining if the second device belongs to the same workgroup comprises comparing an identification signal from the second device to a list of identification signals at the first device.

5. The method of claim 1, wherein establishing a channel comprises broadcasting a polling message and receiving acknowledgement messages sent in response.

6. The method of claim 1, further comprising overwriting data of the first device using the received data.

7. The method of claim 1, wherein determining if the second device belongs to the workgroup of the first device comprises determining at the first device if the second device belongs to the workgroup of the first device.

8. The method of claim 1, wherein resolving conflicts comprises comparing a date of the received data to a date of the data of the first device.

9. The method of claim 1, wherein resolving conflicts comprises displaying any conflicting data to a user with a request for the user to indicate how to resolve the conflict.

10. The method of claim 1, wherein the second device is coupled to a server in a network and wherein the received data comprises a modification to a file on the server.

11. The method of claim 1, wherein the second device comprises a mobile computer device and wherein the received data comprises data received by the second device from a server in a network.

12. The method of claim 1, wherein the second device comprises a mobile computer system and wherein the received data comprises data entered by a user.

13. The method of claim 1, further comprising:
    establishing a connection with a server on a network;
    synchronizing the received data with the server.

14. The method of claim 13, wherein establishing a connection with a server comprises transmitting a server access request message and receiving an access request acknowledgment from the server.

15. The method of claim 13, wherein establishing a connection with a server comprises scanning for a server broadcast message containing a server identification signal; comparing the server identification signal to a stored identification; and if the server identification signal corresponds to the stored identification, then transmitting an access request message to the server.

16. The method of claim 2, further comprising;

identifying further devices based on the polling;

obtaining data from the further devices;

resolving conflicts between the obtained data and data of the first device; and overwriting data of the first device using the obtained data.

17. A machine-readable medium having stored thereon data representing sequences of instructions which, when executed by a machine, cause the machine to perform operations comprising:

establishing a direct wireless communications channel between a first mobile computer device belonging to a workgroup and a second mobile computer device;

determining if the second device belongs to the workgroup of the first device;

if the second device belongs to the workgroup of the first device, then receiving data at the first device from the second device through the wireless communications channel; and resolving conflicts between the received data and data of the first device.

18. The medium of claim 17, wherein the instructions causing the machine to perform operations comprising establishing a channel further comprise instructions causing the machine to perform operations comprising receiving identification signals at the first device sent in response to a polling message and wherein the instructions causing the machine to perform operations comprising determining if the second device belongs to the same workgroup further comprise instructions causing the machine to perform operations comprising comparing an identification signal from the second device to a list of identification signals at the first device.

19. The medium of claim 17, wherein the instructions causing the machine to perform operations comprising establishing a channel further comprise instructions causing the machine to perform operations comprising broadcasting a polling message and receiving acknowledgement messages sent in response.

20. The medium of claim 17, wherein the second device is coupled to a server in a network and wherein the received data comprises a modification to a file on the server.

21. The medium of claim 17, further comprising instructions causing the machine to perform operations comprising:

establishing a connection with a server on a network;

synchronizing the received data with the server.

22. An apparatus comprising:

a data file memory;

an input device to receive data file changes for storage in the data file memory;

a wireless communication interface to exchange data file changes with other mobile computer devices;

a workgroup identification memory to use in determining if other mobile computer devices belong to a workgroup;

a processor coupled to the wireless communication interface, the workgroup identification memory and the data file memory to command the wireless communication interface to establish direct connections with other mobile devices and transmit data file changes to other mobile devices with which a connection is established after a data file change is made to the data file memory.

23. The apparatus of claim 22 wherein the workgroup identification memory contains identification numbers of other devices in the workgroup.

24. The apparatus of claim 22 wherein the input device comprises a user input device.

25. The apparatus of claim 22, further comprising a scanner in the wireless communication interface to listen for polling signals from other devices received through the wireless communication interface and wherein the processor is operable to compare received polling signals with values in the workgroup identification memory and to communicate data file changes to other devices in the workgroup from which polling signals are received.

* * * * *